(12) United States Patent
Pantel et al.

(10) Patent No.: US 9,436,918 B2
(45) Date of Patent: Sep. 6, 2016

(54) SMART SELECTION OF TEXT SPANS

(71) Applicant: Microsoft Technology Licensing, LLC, Redmond, WA (US)

(72) Inventors: Patrick Pantel, Bellevue, WA (US); Michael Gamon, Seattle, WA (US); Ariel Damian Fuxman, San Francisco, CA (US); Bernhard Kohlmeier, Seattle, WA (US); Pradeep Chilakamarri, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 245 days.

(21) Appl. No.: 14/245,646

(22) Filed: Apr. 4, 2014

(65) Prior Publication Data

US 2015/0100524 A1 Apr. 9, 2015

Related U.S. Application Data

(60) Provisional application No. 61/887,954, filed on Oct. 7, 2013.

(51) Int. Cl.
*G06N 3/04* (2006.01)
*G06N 99/00* (2010.01)
(Continued)

(52) U.S. Cl.
CPC ......... *G06N 99/005* (2013.01); *G06F 3/04842* (2013.01); *G06F 17/3053* (2013.01); *G06F 17/3064* (2013.01); *G06F 17/30637* (2013.01); *G06F 17/30867* (2013.01); *G06N 7/005* (2013.01); *G06N 3/04* (2013.01)

(58) Field of Classification Search
CPC ...... G06N 3/04; G06N 99/005; G06N 7/005; G06F 17/3064; G06F 17/30867; G06F 17/30637; G06F 17/3053; G06F 3/04842; G06F 3/0484
See application file for complete search history.

(56) References Cited

U.S. PATENT DOCUMENTS 5,574,840 A * 11/1996 Kwatinetz ........... G06F 3/04842
345/163
7,000,197 B1 * 2/2006 Bou ..................... G06F 3/04842
715/812
(Continued)

OTHER PUBLICATIONS

Generating Queries from User-Selected Text, by Lee, published 2012.*

(Continued)

*Primary Examiner* — Stanley K Hill
*Assistant Examiner* — Thomas Fink
(74) *Attorney, Agent, or Firm* — Alin Corie; Sandy Swain; Micky Minhas

(57) ABSTRACT

A text span forming either a single word or a series of two or more words that a user intended to select is predicted. A document and a location pointer that indicates a particular location in the document are received and input to different candidate text span generation methods. A ranked list of one or more scored candidate text spans is received from each of the different candidate text span generation methods. A machine-learned ensemble model is used to re-score each of the scored candidate text spans that is received from each of the different candidate text span generation methods. The ensemble model is trained using a machine learning method and features from a dataset of true intended user text span selections. A ranked list of re-scored candidate text spans is received from the ensemble model.

20 Claims, 8 Drawing Sheets

(51) Int. Cl.
G06N 7/00 (2006.01)
G06F 3/0484 (2013.01)
G06F 17/30 (2006.01)

(56) References Cited

U.S. PATENT DOCUMENTS

| | | | | |
|---|---|---|---|---|
| 7,603,349 | B1* | 10/2009 | Kraft | G06F 17/30867 |
| 7,856,441 | B1* | 12/2010 | Kraft | G06F 17/3064 |
| | | | | 707/758 |
| 8,260,915 | B1 | 9/2012 | Ashear | |
| 8,520,025 | B2 | 8/2013 | Patterson et al. | |
| 8,626,545 | B2 | 1/2014 | Van Pelt et al. | |
| 8,838,562 | B1* | 9/2014 | Boyen | G06F 3/0481 |
| | | | | 707/706 |
| 2005/0222977 | A1* | 10/2005 | Zhou | G06F 17/30864 |
| 2008/0235203 | A1* | 9/2008 | Case | G06F 17/30672 |
| 2010/0231529 | A1* | 9/2010 | Tikka | G06F 3/04883 |
| | | | | 345/173 |
| 2010/0289757 | A1* | 11/2010 | Budelli | G06F 3/04842 |
| | | | | 345/173 |
| 2011/0050594 | A1 | 3/2011 | Kim et al. | |
| 2011/0093414 | A1* | 4/2011 | Xu | G06F 17/27 |
| | | | | 706/12 |
| 2011/0239110 | A1* | 9/2011 | Garrett | G06F 3/0488 |
| | | | | 715/256 |
| 2011/0310026 | A1* | 12/2011 | Davis | G06F 3/0488 |
| | | | | 345/173 |
| 2011/0320470 | A1* | 12/2011 | Williams | G06F 17/30864 |
| | | | | 707/767 |
| 2012/0078613 | A1* | 3/2012 | Kandekar | G06F 17/2745 |
| | | | | 704/9 |
| 2012/0102401 | A1* | 4/2012 | Ijas | G06F 3/04842 |
| | | | | 715/702 |
| 2012/0139853 | A1* | 6/2012 | Kano | G06F 3/0488 |
| | | | | 345/173 |
| 2012/0229397 | A1* | 9/2012 | Cho | G06F 3/04842 |
| | | | | 345/173 |
| 2012/0306772 | A1* | 12/2012 | Tan | G06F 3/04842 |
| | | | | 345/173 |
| 2012/0311438 | A1 | 12/2012 | Cranfill et al. | |
| 2013/0080881 | A1* | 3/2013 | Goodspeed | G06F 17/21 |
| | | | | 715/251 |
| 2013/0080979 | A1* | 3/2013 | Weir | G06F 3/033 |
| | | | | 715/856 |
| 2013/0285935 | A1* | 10/2013 | Thorsander | G06F 3/04842 |
| | | | | 345/173 |
| 2014/0109009 | A1* | 4/2014 | Xu | G06F 17/30014 |
| | | | | 715/810 |
| 2015/0121291 | A1* | 4/2015 | Scott | G06F 17/3064 |
| | | | | 715/780 |
| 2015/0169067 | A1* | 6/2015 | Hong | G06F 3/04842 |
| | | | | 715/863 |
| 2015/0205490 | A1* | 7/2015 | Nordstrom | H04L 67/02 |
| | | | | 715/739 |

OTHER PUBLICATIONS

Knowledge Base Population: Successful Approaches and Challenges, by Ji, published 2011.*
Placing search in context: The concept Revisited, by Finkelstein, published 2001.*
Query by Document, by Yang, published 2009.*
"Make Webpages Load Faster", Retrieved on: Sep. 13, 2013, Available at: http://web.archive.org/web/20130913155413/https://support.google.com/chrome/answer/1385029?hl=en.
Willet, Edward C., "Microsoft Office 2003 Bible", A Wiley Publication Inc., 2004, p. 549.
"International Search Report & Written Opinion Issued in PCT Patent Application No. PCT/US2014/058506", Mailed Date: Feb. 20, 2015, 11 Pages.
Finkelstein, L., et al., Placing Search in Context: The Concept Revisited, Proc. of the 10th Int'l Conf. on World Wide Web, WWW '01, May 2001, pp. 406-414.

Lee, Chia-Jung, Generating Queries from User-Selected Text, Proceedings of the 4th Information Interaction in Context Symposium, IIIX '12, Aug. 2012, pp. 100-109.
"International Preliminary Report on Patentability Issued in PCT Application No. PCT/US2014/058506", Mailed Date: Dec. 10, 2015, 10 Pages.
Abney, "Parsing by Chunks", Principle-Based Parsing, Nov. 10, 1994, pp. 19, Kluwer Academic Publishers.
Agrawal, et al., "Enriching Textbooks with Images", 2011 International Conference on Information and Knowledge Management (CIKM 2011), Oct. 24-28, 2011, pp. 10, Association for Computing Machinery (ACM).
Balog, et al., "Overview of the TREC 2009 Entity Track", TREC (Text Retrieval Conference) 2009 Working Notes, Nov. 2009, pp. 11, National Institute of Standards and Technology (NIST).
Bendersky, et al., "Discovering Key Concepts in Verbose Queries", 31st Annual International Association for Computing Machinery (ACM) Special Interest Group on Information Retrieval (SIGIR) Conference, Jul. 20-24, 2008, pp. 8, ACM.
Broder, "A taxonomy of web search", Special Interest Group on Information Retrieval (SIGIR) Forum, Fall 2002, pp. 3-10, vol. 36, No. 2, Association for Computing Machinery (ACM).
Broder, et al., "To Swing or not to Swing: Learning when (not) to Advertise", Association for Computing Machinery (ACM) 17th Conference on Information and Knowledge Management (CIKM 2008), Oct. 26-30, 2008, pp. 10, ACM.
Broder, et al., "A Semantic Approach to Contextual Advertising", 30th Annual International Association for Computing Machinery (ACM) Special Interest Group on Information Retrieval (SIGIR) Conference (SIGIR 2007), Jul. 23-27, 2007, pp. 559-566, ACM.
Baeza-Yates, et al., "Query Recommendation using Query Logs in Search Engines", Current Trends in Database Technology—EDBT 2004 Workshops, Mar. 2004, pp. 10, Springer-Verlag.
Becker, et al., "Mind the Gap: Learning to Choose Gaps for Question Generation", 2012 Conference of the North American Chapter of the Association for Computational Linguistics: Human Language Technologies, Jun. 3-8, 2012, pp. 742-751, Association for Computational Linguistics.
Boldi, et al., "The Query-flow Graph: Model and Applications", 17th Association for Computing Machinery (ACM) conference on information and knowledge management (CIKM 2008), Oct. 26-30, 2008, pp. 609-617, ACM.
Cao, et al., "Selecting Good Expansion Terms for Pseudo-Relevance Feedback", 31st Annual International Association for Computing Machinery (ACM) Special Interest Group on Information Retrieval (SIGIR) Conference, Jul. 20-24, 2008, pp. 9, ACM.
Cheng, et al., "EntityRank: Searching Entities Directly and Holistically", Proceedings of the 33rd international conference on Very Large Data Bases (VLDB 2007), Sep. 23-28, 2007, pp. 12, VLDB Endowment.
Cronen-Townsend, et al., "Predicting Query Performance", Proceedings of the 25th annual international Association for Computing Machinery (ACM) Special Interest Group on Information Retrieval (SIGIR) conference (SIGIR 2002) on Research and development in information retrieval, Aug. 11-15, 2002, pp. 8, ACM.
Cucerzan, "Large-Scale Named Entity Disambiguation Based on Wikipedia Data", Proceedings of the 2007 Joint Conference on Empirical Methods in Natural Language Processing and Computational Natural Language Learning, Jun. 2007, pp. 708-716, Association for Computational Linguistics.
Chinchor, "MUC-7 Named Entity Task Definition", Seventh Message Understanding Conference (MUC-7), Sep. 17, 1997, pp. 21, retrieved at <<http://clair.eecs.umich.edu/aan/paper.php?paper_id=M98-1028>>.
Collins, "Discriminative Training Methods for Hidden Markov Models: Theory and Experiments with Perceptron Algorithms", Proceedings of the Conference on Empirical Methods in Natural Language Processing (EMNLP), Jul. 2002, pp. 8, Association for Computational Linguistics.
Dietterich, "Machine-Learning Research—Four Current Directions", AI Magazine, Winter 1997, pp. 97-136, vol. 18, No. 4, American Association for Artificial Intelligence.

(56) References Cited

OTHER PUBLICATIONS

Finkel, et al., "Incorporating Non-local Information into Information Extraction Systems by Gibbs Sampling", Proceedings of the 43rd Annual Meeting of the Association for Computational Linguistics (ACL), Jun. 2005, pp. 363-370, ACL.
Graham, et al., "Visual Search Applications for Connecting Published Works to Digital Material", Proceedings of the International conference on Multimedia (MM 2010), Oct. 25-29, 2010, pp. 2, Association for Computing Machinery (ACM).
Gunawardana, et al., "Usability Guided Key-Target Resizing for Soft Keyboards", Proceedings of the 15th international conference on Intelligent User Interfaces (IUI 2010), Feb. 7-10, 2010, pp. 111-118, Association for Computing Machinery (ACM).
Ji, et al, "Knowledge Base Population: Successful Approaches and Challenges", Proceedings of the 49th Annual Meeting of the Association for Computational Linguistics, Jun. 19-24, 2011, pp. 1148-1158, Association for Computational Linguistics.
Kumaran, et al., "Reducing Long Queries Using Query Quality Predictors", Proceedings of the 32nd international Association for Computing Machinery (ACM) Special Interest Group on Information Retrieval (SIGIR) conference (SIGIR 2009) on Research and development in information retrieval, Jul. 19-23, 2009, pp. 8, ACM.
Kudo, et al., "Chunking with Support Vector Machines", Proceedings of the second meeting of the North American Chapter of the Association for Computational Linguistics on Language technologies (NAACL 2001), Jun. 2, 2001, pp. 1-8, Association for Computational Linguistics.
Kumar, et al., "Voice Typing: A New Speech Interaction Model for Dictation on Touchscreen Devices", Proceedings of the Special Interest Group on Computer Human Interaction (SIGCHI) Conference on Human Factors in Computing Systems (CHI 2012), May 5-10, 2012, pp. 9, Association for Computing Machinery (ACM).
Limaye, et al., "Annotating and Searching Web Tables Using Entities, Types and Relationships", Proceedings of the VLDB Endowment, Sep. 13-17, 2010, pp. 1338-1347, vol. 3, No. 1, VLDB Endowment.
Lv, et al., "Learning to Model Relatedness for News Recommendation", Proceedings of the 20th international conference on World wide web (WWW 2011), Mar. 28-Apr. 1, 2011, pp. 10, Association for Computing Machinery (ACM).
Mihalcea, et al., "Wikify! Linking Documents to Encyclopedic Knowledge", Association for Computing Machinery (ACM) 16th Conference on Information and Knowledge Management (CIKM 2007), Nov. 6-8, 2007, pp. 9, ACM.
Muñoz, et al., "A Learning Approach to Shallow Parsing", 1999 Joint SIGDAT Conference on Empirical Methbds in Natural Language Processing and Very Large Corpora (EMNLP-VLC 1999), Jun. 21-22, 1999, pp. 168-178, Association for Computational Linguistics (ACL), retrieved at <<https://aclweb.org/anthology/sigdat.html#1999_0>>.
Petkova, et al., "Proximity-based Document Representation for Named Entity Retrieval", Association for Computing Machinery (ACM), 16th Conference on Information and Knowledge Management (CIKM 2007), Nov. 6-8, 2007, pp. 10, ACM.
Ratnaparkhi, "Learning to Parse Natural Language with Maximum Entropy Models", Machine Learning 34, Feb. 1999, pp. 151-175, Kluwer Academic Publishers.
Ratinov, et al., "Design Challenges and Misconceptions in Named Entity Recognition", Proceedings of the Thirteenth Conference on Computational Natural Language Learning (CoNLL 2009), Jun. 4, 2009, pp. 9, Association for Computational Linguistics (ACL).
Ramshaw, et al., "Text Chunking using Transformation-Based Learning", Association for Computational Linguistics (ACL) Third Workshop on Very Large Corpora, Jun. 1995, pp. 82-94, ACL.
Rocchio, "Relevance Feedback in Information Retrieval", The SMART Retrieval System—Experiments in Automatic Document Processing, Aug. 1965, pp. 18, Prentice Hall, Inc..
Ribeiro-Neto, et al., "Impedance Coupling in Content-targeted Advertising", 28th annual international Association for Computing Machinery (ACM) Special Interest Group conference on Research and development in information retrieval (SIGIR 2005), Aug. 15-19, 2005, pp. 8, ACM.
Shen, et al., "Context-Sensitive Information Retrieval Using Implicit Feedback", 28th annual international Association for Computing Machinery (ACM) Special Interest Group conference on Research and development in information retrieval (SIGIR 2005), Aug. 15-19, 2005, pp. 8, ACM.
Sadikov, et al., "Clustering Query Refinements by User Intent", Proceedings of the 19th international conference on world wide web (WWW 2010), Apr. 26-30, 2010, pp. 10, Association for Computing Machinery (ACM).
Sakamoto, et al., "Voice Augmented Manipulation: Using Paralinguistic Information to Manipulate Mobile Devices", Proceedings of the 15th international conference on human-computer interaction with mobile devices and services (Mobile HCI 2013), Aug. 27-30, 2013, pp. 69-78, Association for Computing Machinery (ACM).
Sang, et al., "Introduction to the CoNLL-2003 Shared Task: Language-Independent Named Entity Recognition", CONLL '03 Proceedings of the seventh conference on natural language learning at HLT-NAACL 2003, May 31, 2003, pp. 142-147, vol. 4, Association for Computational Linguistics.
Weir, et al., "A User-Specific Machine Learning Approach for Improving Touch Accuracy on Mobile Devices", Proceedings of the 25th annual Association for Computing Machinery (ACM) symposium on user interface software and technology (UIST 2012), Oct. 7-10, 2012, pp. 465-475, ACM.
Welch, et al., "Generating Advertising Keywords from Video Content", Proceedings of the 19th Association for Computing Machinery (ACM) international conference on Information and Knowledge Management (CIKM 2010), Oct. 26-30, 2010, pp. 1421-1424, ACM.
Wu, et al., "Adapting boosting for information retrieval measures", Information Retrieval, Jun. 2010, pp. 254-270, vol. 13, Issue 3, Springer Netherlands.
Yang, et al., "Query by Document", Proceedings of the Second Association for Computing Machinery (ACM) International Conference on Web Search and Data Mining (WSDM 2009), Feb. 9-12, 2009, pp. 10, ACM.
Zhai, et al., "Model-based Feedback in the Language Modeling Approach to Information Retrieval", Proceedings of the 10th international conference on information and knowledge management (CIKM 2001), Nov. 5-10, 2001, pp. 403-410, Association for Computing Machinery (ACM).
Zhang, et al., "Novelty and Redundancy Detection in Adaptive Filtering", Proceedings of the 25th annual international Association for Computing Machinery (ACM) Special Interest Group conference on Research and development in information retrieval (SIGIR 2002), pp. 8, ACM.
Zhou, et al., "Entity-Centric Document Filtering: Boosting Feature Mapping through Meta-Features", Proceedings of the 22nd Association for Computing Machinery (ACM) international conference on Conference on information and knowledge management (CIKM 2013), Oct. 27-Nov. 1, 2013, pp. 10, ACM.
Zhang, et al., "Mining Search Engine Query Logs for Query Recommendation", Proceedings of the 15th international conference on World Wide Web (WWW 2006), May 22-26, 2006, pp. 1039-1040, Association for Computing Machinery (ACM).

* cited by examiner

SMART SELECTION OF TEXT SPANS

CROSS REFERENCE TO RELATED APPLICATION

This application claims the benefit of and priority to provisional U.S. patent application Ser. No. 61/887,954 filed Oct. 7, 2013.

BACKGROUND

In today's productivity environment users are constantly researching topics while consuming or authoring a variety of content in various applications, where these applications can include reader applications such as e-readers, and productivity applications such as word processors, spreadsheets, presentations programs, and social networks. A user commonly uses the World Wide Web (hereafter simply referred to as the Web) to research topics. For example, a user may select a text span within a document that is currently being displayed to them, and may then search the Web for the selected text span.

Due to factors such as economic globalization and ongoing advances in computing, data communication, and computer networking technologies, users across the globe are becoming increasingly mobile. Various types of mobile computing devices are now commercially available which allow users to affordably and conveniently perform full-fledged computing and data communication activities while they are on the move. Smartphones and tablet computers are two examples of such mobile computing devices. The popularity of mobile computing devices continues to grow rapidly, as does the types of mobile computing applications that are available. Accordingly, the number of users that regularly use a mobile computing device to perform their online computing, communication, and information management tasks (such as the just-described researching of topics) continues to grow rapidly. In fact, mobile computing devices have become a principal computing device for many users.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Smart selection technique embodiments described herein generally involve predicting a text span forming either a single word or a series of two or more words that a user intended to select. In one exemplary embodiment a document that includes a string of characters is received and a location pointer that indicates a particular location in the document is also received. The document and location pointer are then input to a plurality of different candidate text span generation methods. A ranked list of one or more scored candidate text spans is then received from each of the different candidate text span generation methods. A machine-learned ensemble model is then used to re-score each of the scored candidate text spans that is received from each of the different candidate text span generation methods, where the ensemble model is trained using a machine learning method and features from a dataset of true intended user text span selections. A ranked list of re-scored candidate text spans is then received from the ensemble model.

In another exemplary embodiment the document and location pointer are input to a machine-learned hyperlink intent model. A ranked list of scored candidate text spans is then received from the hyperlink intent model.

DESCRIPTION OF THE DRAWINGS

The specific features, aspects, and advantages of the smart selection technique embodiments described herein will become better understood with regard to the following description, appended claims, and accompanying drawings where:

DETAILED DESCRIPTION

Figure 1:
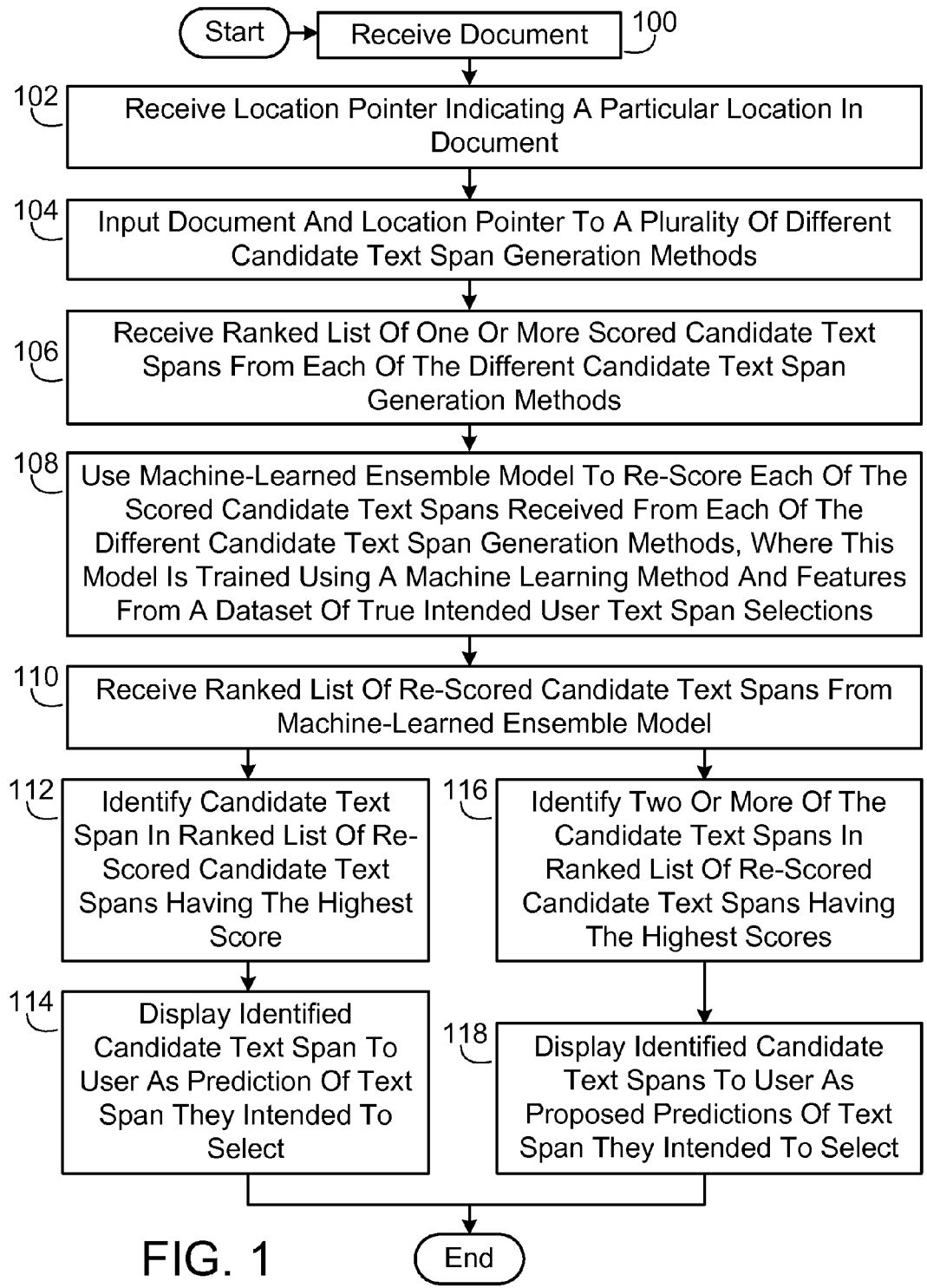
FIG. 1 is a flow diagram illustrating one embodiment, in simplified form, of a process for predicting a text span forming either a single word or a series of two or more words that a user intended to select.

In the following description of smart selection technique embodiments reference is made to the accompanying drawings which form a part hereof, and in which are shown, by way of illustration, specific embodiments in which the smart selection technique can be practiced. It is understood that other embodiments can be utilized and structural changes can be made without departing from the scope of the smart selection technique embodiments.

It is also noted that for the sake of clarity specific terminology will be resorted to in describing the smart selection technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the smart selection technique. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the smart selection technique does not inherently indicate any particular order not imply any limitations of the smart selection technique.

1.0 Text Selection by Users

The term "document" is used herein to refer to any item of information that includes a string of characters (e.g., text) and can be displayed on the display screen of a computing device. The term "text span" is used herein to refer to a sequence of one or more characters (e.g., a span of text) that is included within a document and forms a single unit (e.g., a text span forms either an entity, or a concept, or a topic). Accordingly, a text span can form either a single word or a series of two or more words, among other things. In the smart selection technique embodiments described herein a user selects a text span in a document that they are either reading or authoring. The term "touch-enabled computing device" is used herein to refer to any computing device having a natural touch user interface that includes a touch-sensitive display screen upon which a user can make touch gestures.

As is appreciated in the arts of computing and user interfaces, traditional personal computers (PCs) and laptop/notebook computers have long included a pointing device (e.g., a mouse, or a trackpad/touchpad, or the like) that users can use to select a desired item or portion of information that is displayed to them. More particularly and by way of example but not limitation, for decades users of traditional PCs and laptop/notebook computers have relied on using such a pointing device to select a text span within a document that is currently being displayed, and to perform various functions on a selected text span. Examples of such functions include, but are not limited to, copying and pasting the selected text span, looking up the selected text span in either a dictionary or a thesaurus, searching the Web for the selected text span, and translating the selected text span.

As described heretofore, the number of users that regularly use a mobile computing device to perform their online computing, communication, and information management tasks (such as the aforementioned researching of topics while consuming or authoring a variety of content in various applications) continues to grow rapidly. As is also appreciated in the arts of computing and user interfaces, mobile computing devices are but one example of touch-enabled computing devices. Today, PCs and laptop/notebook computers are also often configured as touch-enabled computing devices. Accordingly, many users today routinely perform text span and related function selection via touch interaction with (e.g., touch gestures on the touch-sensitive display screen of) various types of touch-enabled computing devices.

As is also appreciated in the arts of computing and user interfaces, a pointing device offers a high degree of selection acuity (e.g., selection resolution). Although the natural touch user interface of a touch-enabled computing device can provide users with a more intuitive and arguably a more natural form of user interaction with the computing device, the natural touch user interface also offers a significantly lower degree of selection acuity than a pointing device.

2.0 Smart Selection of Text Spans

Generally speaking, the smart selection technique embodiments described herein provide a new natural language processing and text selection paradigm that allows a user to select a text span within a document that is currently being displayed to the user. More particularly, given the user selection of a particular location in a document that includes a string of characters, the smart selection technique embodiments predict a text span forming either a single word or a series of two or more words that the user intended to select, where this predicted text span is contextually relevant to the content of the document. In other words, the smart selection technique embodiments predict the user's focus of attention based on a particular location (e.g., a single character, among other possible things) that they select in a document. By way of example but not limitation, suppose a user is reading or authoring an article about the Syrian crisis on a touch-enabled computing device and they tap on any part of the word "Federation" in the sentence "The Russian Federation has proposed a plan for the destruction of Syria's chemical weapons" that appears in the article. The smart selection technique embodiments might predict that even though the user selected the word "Federation", they intended to select the text span "Russian Federation" (e.g., their intended focus of attention is the "Russian Federation"). By way of further example, suppose a user is reading or authoring a sports news article and they tap on any part of the word "San" in the sentence "The San Francisco 49ers scored big in last Monday's game" that appears in the article. The smart selection technique embodiments might predict that even though the user selected the word "San", they intended to select the text span "San Francisco 49ers" (e.g., their intended focus of attention is the "San Francisco 49ers").

In an exemplary embodiment of the smart selection technique described herein the text span prediction that is performed by the smart selection technique embodiments applies to cases where the user intends to perform research on the text span in order to learn more about it. Exemplary types of research that the user might perform include, but are not limited to, either looking up the text span in a dictionary or a thesaurus or Wikipedia, or searching the Web for the text span, or translating the text span.

It is noted that although the smart selection technique embodiments are described herein in the context of a user using a touch-enabled computing device to read or author a document on the touch-sensitive display screen of the computing device, where the user selects a particular location in the document by making a single touch gesture (e.g., a tap) on top of the location, alternate embodiments of the smart selection technique are possible where the user can select the location using various other modalities. By way of example but not limitation, in the case where the computing device that the user is using to read/author the document includes a pointing device, the user can select a particular location in the document by using the pointing device. In the case where the computing device that the user is using to read/author the document includes a speech recognition capability, the user can select a particular location in the document corresponding to a particular word in the document by speaking the word. In the case where the computing device that the user is using to read/author the document includes a user-facing video camera that can be used to track the user's eye gaze, the user can select a particular location in the document by gazing at the location.

FIG. 1 illustrates one embodiment, in simplified form, of a process for predicting a text span forming either a single word or a series of two or more words that a user intended to select. As exemplified in FIG. 1, the process starts with receiving a document that includes a string of characters (action 100). A location pointer is then received that indicates a particular location in the document (action 102). In an exemplary embodiment of the smart selection technique described herein where the user is using a touch-enabled computing device and the document is displayed on the touch-sensitive display screen of the computing device, the location pointer can be generated by the user touching (e.g., tapping on) the display screen on top of the particular location in the document. In the case where this particular location corresponds to a specific character in the document, the location pointer will be a character offset that indicates this specific character that the user selected in the document.

Referring again to FIG. 1, after the document and location pointer have been received (actions 100 and 102), they are input to a plurality of different candidate text span generation methods (action 104) exemplary embodiments of which are described in more detail hereafter. A ranked list of one or more scored candidate text spans is then received from each of the different candidate text span generation methods (action 106). A machine-learned ensemble model is then used to re-score each of the scored candidate text spans that is received from each of the different candidate text span generation methods, where this model is trained using a machine learning method and features from a dataset of true intended user text span selections (action 108) that is constructed by the smart selection technique embodiments described herein. Various machine learning methods can be used to train the ensemble model. By way of example but not limitation, in one embodiment of the smart selection technique described herein the machine learning method that is used to train the ensemble model is logistic regression. In another embodiment of the smart selection technique the machine learning method that is used to train the ensemble model is a conventional gradient-boosted decision trees method. In yet another embodiment of the smart selection technique the machine learning method that is used to train the ensemble model is a conventional support vector machine method. The machine-learned ensemble model and dataset of true intended user text span selections are also described in more detail hereafter. A ranked list of re-scored candidate text spans is then received from the machine-learned ensemble model (action 110).

Referring again to FIG. 1, after the ranked list of re-scored candidate text spans has been received from the machine-learned ensemble model (action 110), one or more predictions of the text span that the user intended to select are provided to the user in the following manner. In one embodiment of the smart selection technique described herein the candidate text span in the ranked list of re-scored candidate text spans having the highest score is identified (action 112), and this identified candidate text span is displayed to the user as a prediction of the text span that they intended to select (action 114). As will be appreciated from the more detailed description that follows, this identified candidate text span is contextually relevant to the content of the document, and can be either a single word or a phrase that includes two or more words. In another embodiment of the smart selection technique two or more of the candidate text spans in the ranked list of re-scored candidate text spans having the highest scores are identified (action 116), and these identified candidate text spans are displayed to the user as proposed predictions of the text span that they intended to select (action 118). As will also be appreciated from the more detailed description that follows, each of these identified candidate text spans are contextually relevant to the content of the document, and can be either a single word or a phrase that includes two or more words.

Figure 2:
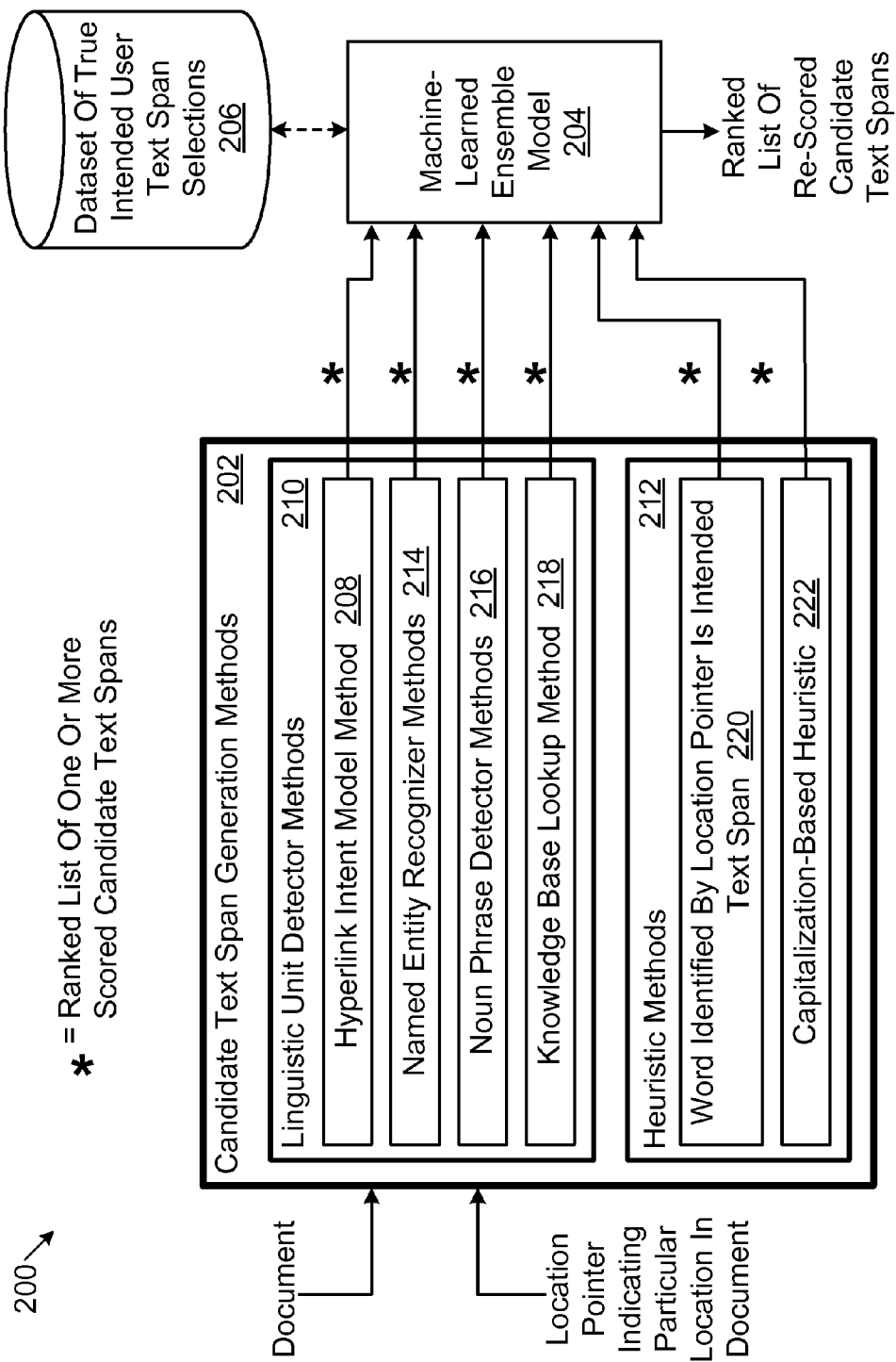
FIG. 2 is a diagram illustrating an exemplary embodiment, in simplified form, of an ensemble learning framework for predicting a text span forming either a single word or a series of two or more words that a user intended to select.

FIG. 2 illustrates an exemplary embodiment, in simplified form, of an ensemble learning framework for predicting a text span forming either a single word or a series of two or more words that a user intended to select. As exemplified in FIG. 2, the ensemble learning framework 200 includes the aforementioned plurality of different candidate text span generation methods 202, machine-learned ensemble model 204, and dataset of true intended user text span selections 206. The dashed lined between the dataset of true intended user text span selections 206 and the machine-learned ensemble model 204 indicates that the dataset 206 is just used to train the model 204. In an exemplary embodiment of the smart selection technique described herein the different candidate text span generation methods 202 can include, but are not limited to, either a plurality of different linguistic unit detector methods 210, or a plurality of different heuristic methods 212, or a combination of one or more different linguistic unit detector methods 210 and one or more different heuristic methods 212. The different linguistic unit detector methods 210 can include, but are not limited to, a hyperlink intent model method 208, one or more different named entity recognizer methods 214, one or more different noun phrase detector methods 216, and a knowledge base lookup method 218. The different heuristic methods 212 can include, but are not limited to, a heuristic which assumes that a word that is identified by the location pointer is the text span that the user intended to select 220, and a capitalization-based heuristic 222.

As is also exemplified in FIG. 2 and as will be described in more detail hereafter, each of the different candidate text span generation methods 202 receives both a document that the user is working on and a location pointer that indicates a particular location in the document, and outputs a ranked list of one or more scored candidate text spans. The machine-learned ensemble model 204 receives the document, location pointer, and all of the scored candidate text spans that are output from the different candidate text span generation methods 202, re-scores each of the received scored candidate text spans, and outputs a ranked list of re-scored candidate text spans. As will be described in more detail hereafter, the machine-learned ensemble model 204 is a meta-model that is trained using the aforementioned machine learning method and features from the dataset of true intended user text span selections 206.

The smart selection technique embodiments described herein are advantageous for various reasons including, but not limited to, the following. The smart selection technique embodiments are compatible with, and thus can be implemented on, any touch-enabled computing device. The smart selection technique embodiments also allow a user to select a multi-word text span by performing just a single touch gesture (e.g., a tap) on a touch-sensitive display screen (e.g., the user does not have to perform an intricate series of touch gestures in order to select a multi-word text span). The smart selection technique embodiments thus augment a conventional natural touch user interface in a manner that makes the user's experience when selecting multi-word text spans on a touch-enabled computing device significantly less cumbersome. The smart selection technique embodiments also perform the semantic task of recovering (e.g., predicting) the user's intent. As such, the smart selection technique embodiments significantly outperform various standalone conventional linguistic analysis methods, and produce significantly more accurate predictions of the text span that a user intended to select.

2.1 Smart Selection Paradigm Definition

This section describes an exemplary embodiment, in simplified form, of a paradigm for implementing the smart selection technique embodiments described herein.

D denotes the set of all documents. A user selection is herein defined to be a location pointer that indicates a particular location in a given document $d \in D$. As described heretofore, in the case where this particular location corresponds to a specific character in d, the location pointer will be a character offset that indicates this specific character that the user selected in d. S denotes the set of all possible user selections in D. $S_d$ denotes the set of all possible user selections in d. $\sigma = \langle x, y \rangle$ denotes a given scored candidate text span (e.g., a smart selection) in d, where $X \in S_d$ denotes a given candidate text span in d and $y \in \mathbb{R}$ denotes a score for the candidate text span. $\phi$ denotes a smart selection function that produces a ranked list of one or more scored candidate text spans (e.g., a ranked list of one or more scored smart selections) from a given document and user selection pair. $\phi$ can be given by the expression:

$$\phi: D \times S \rightarrow (\sigma_1, \ldots, \sigma_{|S_d|} | x_i \in S_d, y_i \geq y_i + 1).$$

Having the output of $\phi$ be made up of a ranked list of scored candidate text spans instead of just a single text span is advantageous since it permits an embodiment of the smart selection technique described herein where a list of the N highest ranking candidate text spans (n being a prescribed number) is proposed to the user.

Given a user selection S that is made in a document d, $\tau$ denotes the target text span that represents what the user intended to select. It will be appreciated that each of the different candidate text span generation methods described herein corresponds to a separate implementation of the smart selection function $\phi$. The smart selection technique embodiments described herein use the machine-learned ensemble model, which is trained using the aforementioned machine learning method (e.g., either logistic regression, or a conventional gradient-boosted decision trees method, or a conventional support vector machine method, among others) and features from the dataset of true intended user text span selections, to evaluate and re-score the combined set of scored candidate text spans that are output by the different candidate text span generation methods. Accordingly, the smart selection technique embodiments can be used to recover/predict $\tau$ from any $\langle d, s \rangle$ pair (e.g., from any user selection in any document).

It will be appreciated that even for a human being, the task of predicting a user's intended selection from a location pointer is not trivial. While there are some fairly clear cut cases (such as expanding a user selection of any part of the word "Obama" to "Barack Obama" in the sentence "While in DC, Barack Obama met with . . . "), there are also other cases where the user's intention depends on extrinsic factors such as their interests (among other possible extrinsic factors). By way of example but not limitation, given a user selection of any part of the word "California" in the text span "University of California at Santa Cruz", some (albeit probably a very small number of) users may be interested in the state of California, while other users may be interested in the University of California system of universities, while yet other users may be specifically interested in the University of California at Santa Cruz.

2.2 Dataset of True Intended User Text Span Selections

This section describes the construction of the dataset of true intended user text span selections that is used to train the machine-learned ensemble model. In an exemplary embodiment of the smart selection technique described herein this dataset is constructed using a real-world application of having a prescribed set of users interact with a conventional touch-enabled e-reader device. In this application each of the users in the set is reading a given book that is displayed on the e-reader, and selects text spans from the book for which they would like to get additional information, where this information can come from a variety of online information resources such as a dictionary, or a thesaurus, or Wikipedia, or a Web search, among various other online information resources. Because of the natural touch user interface of the e-reader device, each of the users in the set is limited to touching on just a single word. It is noted that alternate embodiments of the smart selection technique are also possible where one or more of the users in the set can make their text span selections in various other ways. By way of example but not limitation, a given user can be reading a paper form of their book, and can make their text span selections using a highlighter pen. A given user can also be reading their book on the display screen of a computing device that is configured with a pointing device, and can make their text span selections using the pointing device.

Figure 3:
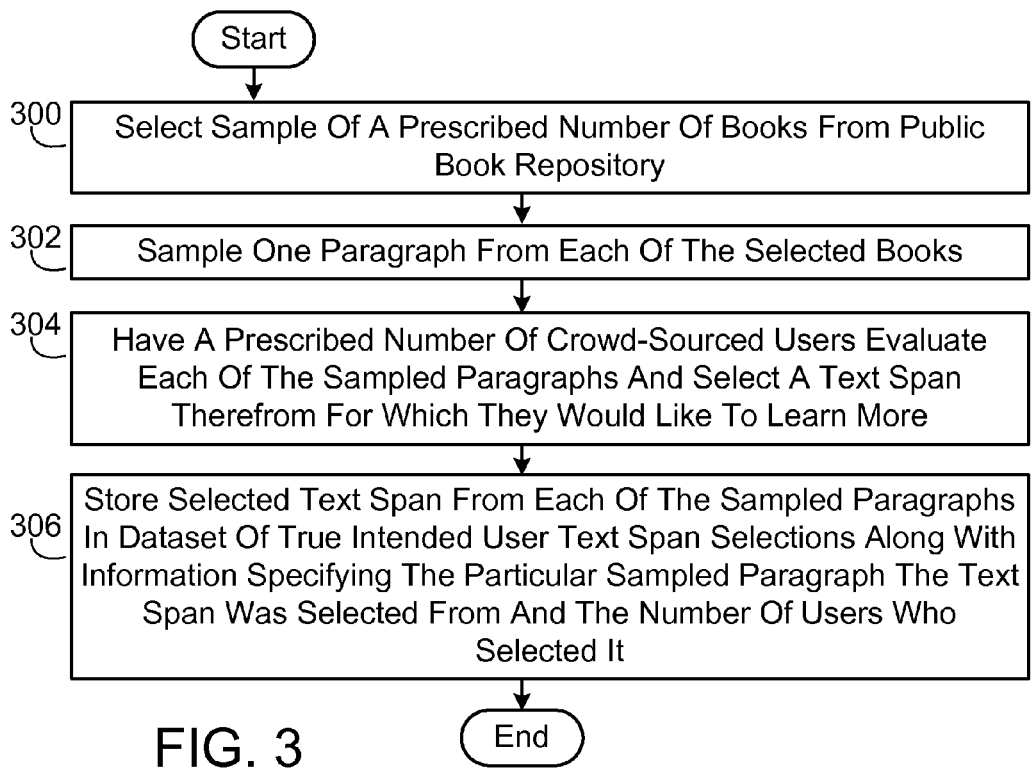
FIG. 3 is a flow diagram illustrating an exemplary embodiment, in simplified form, of a large-scale crowd-sourcing method for constructing a dataset of true intended user text span selections that is used by the smart selection technique embodiments described herein.

FIG. 3 illustrates an exemplary embodiment, in simplified form, of a large-scale crowd-sourcing method for constructing the dataset of true intended user text span selections. The crowd-sourcing method exemplified in FIG. 3 can be thought of as a large-scale crowd-sourced user study/exercise. As is appreciated in the art of online information resources, Wikibooks (which is available at http://www.wikibooks.org/) is a repository of publicly available, open-content textbooks. The crowd-sourcing method embodiment uses the entire collection of English textbooks from Wikibooks, where this collection is made up of 2,696 textbooks that span a large variety of categories such as Computing, Humanities, and Science, among others.

As exemplified in FIG. 3 the crowd-sourcing method starts with selecting a sample of a prescribed number of books from a public book repository (action 300). In an exemplary embodiment of the smart selection technique described herein the public book repository is Wikibooks and the prescribed number of books is 100. Other embodiments are also possible where any other public book repository can be used, and where the prescribed number of books can be either less than or greater than 100. One paragraph is then randomly sampled from each of the selected books (action 302). Each of the sampled paragraphs is then evaluated by a prescribed number of crowd-sourced users, where each of the crowd-sourced users is instructed to select a text span from the sample paragraph for which they would like to learn more using online information resources such as those described heretofore (action 304). In an exemplary embodiment of the smart selection technique described herein the prescribed number of crowd-sourced users is 100, although other embodiments are also possible where the prescribed number of crowd-sourced users can be either less than or greater than 100.

Referring again to FIG. 3, after the different crowd-sourced users have selected their text spans from the sampled paragraphs (action 304), the selected text span from each of the sampled paragraphs is stored in the dataset of true intended user text span selections along with information specifying the particular sampled paragraph that the text span was selected from and the number of users who selected it (action 306). Accordingly, the resulting dataset of true intended user text span selections includes a collection of $\langle d, \tau \rangle$ pairs, where d specifies a given sampled paragraph, and $\tau$ specifies the text span that was selected from this paragraph by one or more of the crowd-sourced users along with the number of users who selected it (in other words, $\tau$ is a true intended user selection). In an exemplary embodiment of the smart selection technique described herein each of the $\langle d, \tau \rangle$ pairs is assigned to one of five randomly chosen folds which, as will be described in more detail hereafter, are used to train the machine-learned ensemble model. Intuitively, it will be appreciated that the more users who select a given text span in the dataset of true intended user text span selections, the more likely this text span will be of interest to readers of the sampled paragraph from which this text span was selected. The smart selection technique embodiments described herein thus use the number of users who selected each of the text spans in the dataset of true intended user text span selections as a proxy for the likelihood that the text span will be chosen by a user who is reading a document that includes the text span.

After the dataset of true intended user text span selections has been constructed, this dataset is augmented with a testset of simulated user text span selections as follows. A test case is herein defined to be a triple $\langle d, s, \tau \rangle$, where d specifies a given sampled paragraph, S specifies a simulated user text span selection, and $\tau$ specifies the text span that was selected from this paragraph along with the number of users who selected this text span. For each of the $\langle d, \tau \rangle$ pairs in the dataset of true intended user text span selections a prescribed number (n) of corresponding test cases are constructed by simulating the touch-based user text span selections $\{\langle d, \tau, s_1 \rangle, \ldots, \langle d, \tau, s_n \rangle\}$, where $S_1, \ldots, S_n$ correspond to the individual words in $\tau$. In other words, each of the words in $\tau$ is considered to be a candidate user selection. All of the test cases in which just a single user selected $\tau$ can be discarded based on the observation that these test cases mostly involve errors and noise, such as full sentences and nonsensical long sentence fragments, among others. The resulting traffic-weighted multi-set of remaining test cases is denoted as the testset $T_{ALL}$. Accordingly, each test case $\langle d, s, \tau \rangle$ appears k times in $T_{ALL}$, where k is the number of crowd-sourced users who selected $\tau$ in d.

The distribution of user selections in the testset $T_{ALL}$ is then partitioned into three other testsets, namely $T_{HEAD}$, $T_{TORSO}$ and $T_{TAIL}$. More particularly, following the stratified sampling methodology that is commonly employed in the art of statistics, a testset $T_{HEAD}$ is constructed that includes the frequently selected intended user selections, another testset $T_{TORSO}$ is constructed that includes the less frequently selected intended user selections, and yet another testset $T_{TAIL}$ is constructed that includes the rarely selected intended user selections.

2.3 Candidate Text Span Generation Methods

As is appreciated in the art of natural language processing, various candidate text span generation methods can be used to identify multi-word text spans that have coherent properties. As is also appreciated in the art of natural language processing, user text span selections are often either named entities, or noun phrases, or concepts. This section provides a more detailed description of exemplary embodiments of the different candidate text span generation methods that can be used by the smart selection technique embodiments described herein. In this more detailed description that follows, it will be understood that the location pointer described herein identifies a word that a user selected in a document they are working on.

Information in the dataset of true intended user text span selections described herein indicates that named entities make up just one quarter (approximately) of the text spans that users intend to select, and noun phrases and concepts individually make up other portions of the text spans that users intend to select. As such, it will be appreciated that no single conventional linguistic analysis method is sufficient to address all of the different user text span selection possibilities. One embodiment of the smart selection technique described herein leverages a combination of two or more different candidate text span generation methods in order to benefit from their complementary abilities to address all of the different types of user intended text span selections that are possible.

2.3.1 Linguistic Unit Detector Methods

This section provides a more detailed description of exemplary embodiments of the different linguistic unit detector methods that can be used by the smart selection technique embodiments described herein. As will be appreciated from the more detailed description that follows, the exemplary linguistic unit detector methods described herein can identify either a named entity, or a noun phrase, or a concept that subsumes the word that is identified by the location pointer. In other words, the linguistic unit detector methods described herein use notions of a linguistic unit that are either based on linguistic constituency, or are based on knowledge base presence. As such, in each of the linguistic unit detector methods described herein any detected linguistic unit that subsumes the word that is identified by the location pointer is treated as a candidate text span. Based on the assumption that the longer a given text span is (e.g., the more characters that are in the text span) the more specific it is, and thus the more likely it is to be what the user intended to select, each of the candidate text spans that is identified by each of the linguistic unit detector methods is scored based on the normalized length of the candidate text span. Accordingly, the candidate text span having the largest normalized length will be given the highest score.

2.3.1.1 Named Entity Recognizer Method

As is appreciated in the art of natural language processing, various conventional named entity recognizer methods exist that can be used to identify named entities such as people, places, organizations, and the like. Generally speaking, the smart selection technique embodiments described herein can use any named entity recognizer method or any combination of two or more different named entity recognizer methods. More particularly, in one embodiment of the smart selection technique described herein any named entity recognizer method can be used to identify a candidate text span which is a named entity that subsumes the word that is identified by the location pointer. In another embodiment of the smart selection technique a combination of any two or more different named entity recognizer methods can be used to identify candidate text spans which are named entities that subsume the word that is identified by the location pointer. In an exemplary embodiment of the smart selection technique, when a given named entity recognizer method is unable to identify a named entity that subsumes the word that is identified by the location pointer, the named entity recognizer method will output this word as the candidate text span it identified.

2.3.1.2 Noun Phrase Detector Method

As is appreciated in the art of natural language processing, various conventional noun phrase detector methods (some-times referred to as parsers or chunkers) exist that can be used to identify syntactic constituents such as noun phrases. Generally speaking, the smart selection technique embodiments described herein can use any noun phrase detector method or any combination of two or more different noun phrase detector methods. More particularly, in one embodiment of the smart selection technique described herein a conventional noun phrase detector method that learns to parse natural language with maximum entropy models is used to identify candidate text spans which are noun phrases that subsume the word that is identified by the location pointer. In another embodiment of the smart selection technique a combination of any two or more different noun phrase detector methods can be used to identify candidate text spans which are noun phrases that subsume the word that is identified by the location pointer. In an exemplary embodiment of the smart selection technique, when a given noun phrase detector method is unable to identify any noun phrases that subsume the word that is identified by the location pointer, the named entity recognizer method will output this word as the candidate text span it identified.

2.3.1.3 Knowledge Base Lookup Method

The knowledge base lookup method that is used in the smart selection technique embodiments described herein is based on the assumption that concepts and other entries in a knowledge base are, by nature, things that can be of interest to people. The knowledge base lookup method uses a Web graph to identify candidate text spans which are either named entities that subsume the word that is identified by the location pointer, or noun phrases that subsume this word, or concepts that subsume this word. The Web graph can include information from any knowledge base or any combination of two or more different knowledge bases. Exemplary knowledge bases that can be used by the smart selection technique embodiments include, but are not limited to, Wikipedia (available at http://en.wikipedia.org), Freebase (available at http://www.freebase.com/), and one or more paid feeds from providers that supply online information for particular information domains such as entertainment and finance (among many others). In an exemplary embodiment of the smart selection technique, when the knowledge base lookup method is unable to identify any entries in the Web graph that subsume the word that is identified by the location pointer, the knowledge base lookup method will output this word as the candidate text span it identified.

2.3.1.4 Hyperlink Intent Model Method

As will be appreciated from the more detailed description that follows, the hyperlink intent model method is a machine-learned linguistic unit detector method that is based on the intuition that anchor texts in a large knowledge base can be good representations of what users might want to learn more about (e.g., the hyperlink intent model method assumes that such anchor texts are similar in nature to a text span that a user would select during a researching task). As is appreciated in the arts of the Internet and online information, an anchor text is the visible, user-selectable text in a hyperlink and often times gives users relevant descriptive or contextual information about the content of the hyperlink's destination. The hyperlink intent model method builds upon the fact that knowledge base editors write anchor texts for entities, concepts and other things of potential interest to users. Given the word that is identified by the location pointer, the hyperlink intent model method uses a machine-learned hyperlink intent model to identify candidate text spans that subsume this word, where each of these candidate text spans is an anchor text that is recovered from a large knowledge base. In an exemplary embodiment of the smart selection technique described herein the large knowledge base is Wikipedia, although it is noted that alternate embodiments of the smart selection technique are also possible where any other type of large knowledge base can be used, or a combination of two or more different knowledge bases can be used.

More particularly and as will now be described in more detail, given the word in the document that is identified by the location pointer, the hyperlink intent model method iteratively decides whether or not to expand this word either one word to the left thereof in the document, or one word to the right thereof in the document, via greedy binary decisions that are made using two different binary classifiers, where the iterations continue until a prescribed stopping condition is met. In one embodiment of the smart selection technique described herein this stopping condition is the classifier assigned probability of expansion being below a given threshold. In another embodiment of the smart selection technique described herein this stopping condition is a maximum pre-defined length of selection being reached.

Figure 4:
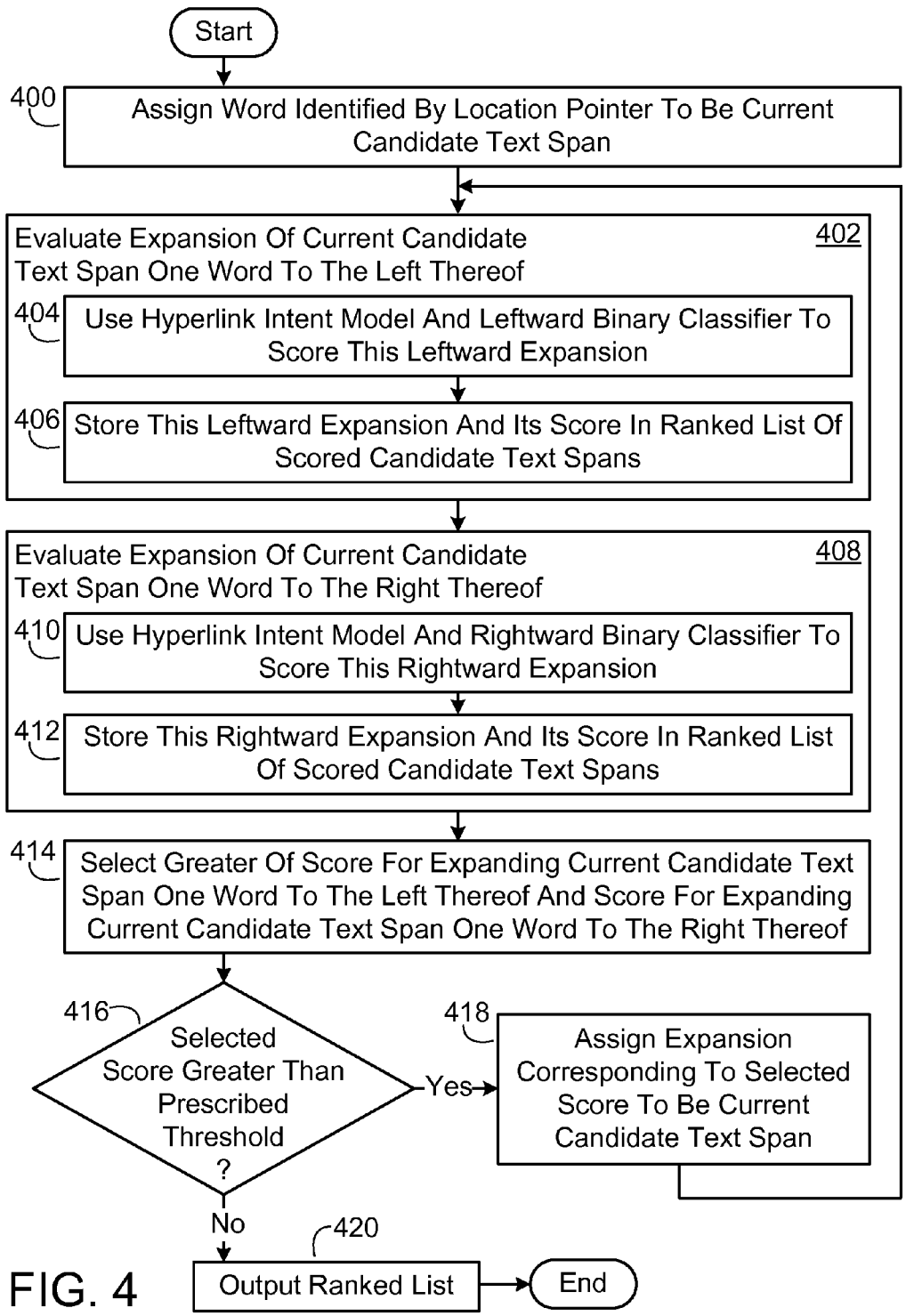
FIG. 4 is a flow diagram illustrating an exemplary embodiment, in simplified form, of a process for using a hyperlink intent model method to identify candidate text spans that predict what a user intended to select.
Figure 5:
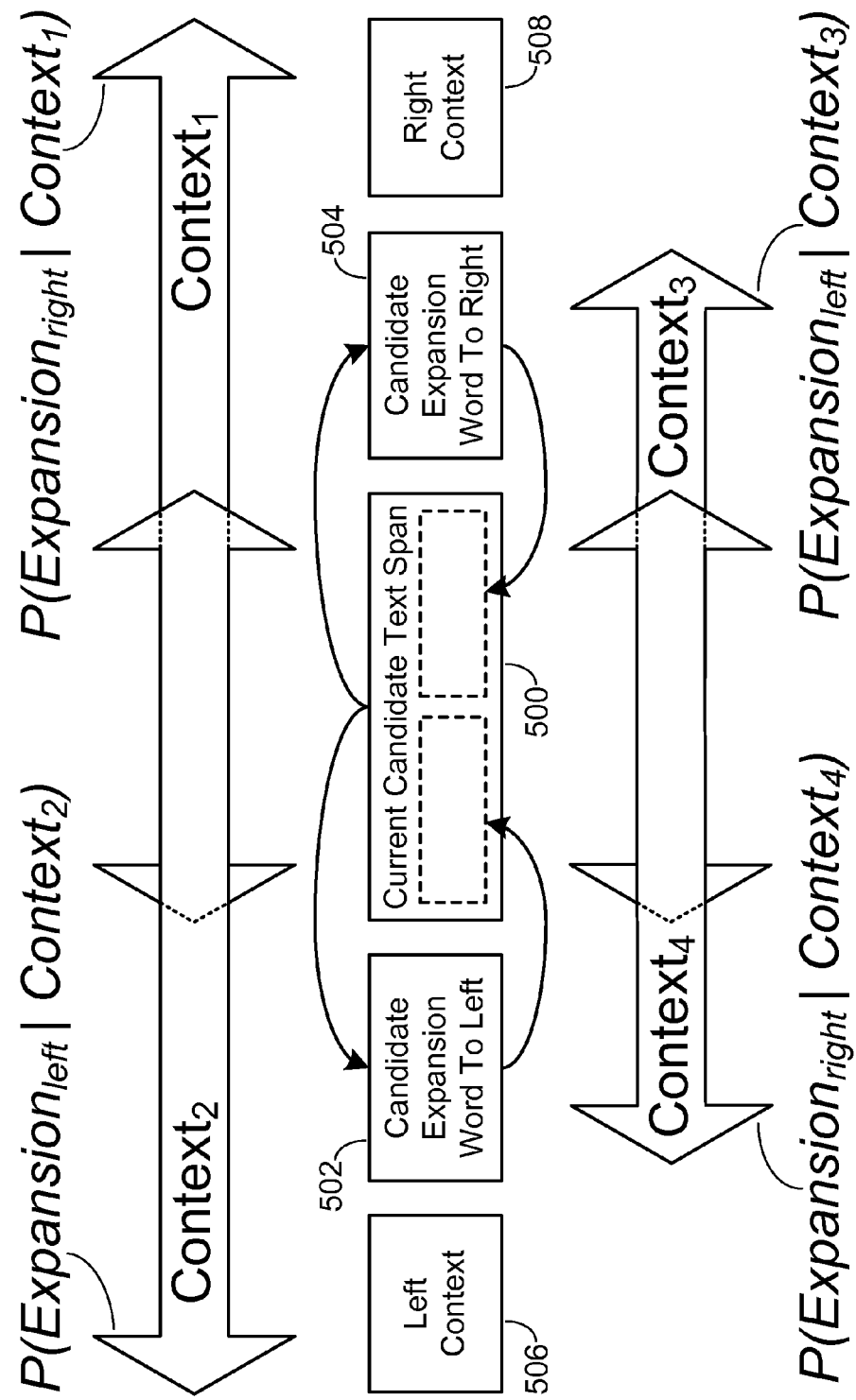
FIG. 5 is a diagram providing a graphical illustration, in simplified form, of an exemplary embodiment of the decoding flow for the process exemplified in FIG. 4.

FIG. 4 illustrates an exemplary embodiment, in simplified form, of a process for using the machine-learned hyperlink intent model to identify candidate text spans that subsume the word that is identified by the location pointer. FIG. 5 provides a graphical illustration, in simplified form, of an exemplary embodiment of the decoding flow for the process exemplified in FIG. 4. As exemplified in FIG. 4, the process starts with assigning the word that is identified by the location pointer to be the current candidate text span (action 400). The expansion of the current candidate text span one word to the left thereof is then evaluated (action 402), where this evaluation includes using the hyperlink intent model and a leftward binary classifier to score this leftward expansion (action 404), and then storing this leftward expansion and its score in a ranked list of scored candidate text spans (action 406). The expansion of the current candidate text span one word to the right thereof is then evaluated (action 408), where this evaluation includes using the hyperlink intent model and a rightward binary classifier to score this rightward expansion (action 410), and then storing this rightward expansion and its score in the ranked list of scored candidate text spans (action 412). It is noted that the just-described scoring of the expansion of the current candidate text span one word to the left thereof includes evaluating this leftward expansion from the outside in (e.g., from the perspective of the word immediately to the left of the current candidate text span to the left-most word in the candidate text span). Similarly, the just-described scoring of the expansion of the current candidate text span one word to the right thereof includes evaluating this rightward expansion from the outside in (e.g., from the perspective of the word immediately to the right of the current candidate text span to the right-most word in the candidate text span).

Referring again to FIG. 4, after the expansions of the current candidate text span one word to the left thereof and one word to the right thereof have been evaluated (actions 402 and 408), the greater of the score for expanding the current candidate text span one word to the left thereof and the score for expanding the current candidate text span one word to the right thereof is then selected (action 414). Whenever this selected score is greater than a prescribed threshold (action 416, Yes), the expansion corresponding to the selected score is assigned to be the current candidate text span (action 418), and actions 402-416 are repeated. Whenever this selected score is not greater than the prescribed threshold (action 416, No), the ranked list of scored candidate text spans is output (action 420).

The machine-learned hyperlink intent model is trained using a set of training data that is automatically generated from anchor texts which are randomly sampled from a knowledge base, where this training data includes both positive training examples and negative training examples. In an exemplary embodiment of the smart selection technique described herein this set of training data is generated in the following manner. A prescribed number of anchor texts is first randomly sampled from the large knowledge base, where each of the sampled anchor texts is treated as a user intended selection, and each of the words in each of the sampled anchor texts is treated as a simulated user text span selection. The following actions then take place for each of the sampled anchor texts. A positive training example is generated for each word that is to the left of the word that is identified by the location pointer and is part of the sampled anchor text. A positive training example is also generated for each word that is to the right of the word that is identified by the location pointer and is part of the sampled anchor text. A negative training example is generated for each word that is to the left of the word that is identified by the location pointer and is outside of the sampled anchor text. A negative training example is also generated for each word that is to the right of the word that is identified by the location pointer and is outside of the sampled anchor text. Additional negative training examples are also generated by sampling random words from the large knowledge base that are not part of any of the sampled anchor texts. In an exemplary implementation of this training embodiment where the large knowledge base is Wikipedia, the prescribed number is 8192, and the final set of training data includes approximately 2.6 million data points with a 1:20 ratio of positive to negative training examples.

As exemplified in FIG. 5, in an exemplary embodiment of the smart selection technique described herein the leftward binary classifier uses logistic regression and a leftward set of features that includes features which are computed over the current candidate text span (500) (initially the word that is identified by the location pointer), features which are computed over the one word to the left of the current candidate text span (502), and features which are computed over another word 506 that is immediately to the left of this one word 502. Similarly, the rightward binary classifier uses logistic regression and a rightward set of features that includes features which are computed over the current candidate text span (500), features which are computed over the one word to the right of the current candidate text span (504), and features which are computed over another word 508 that is immediately to the right of this one word 504. The features in the leftward and rightward sets of features can be grouped into the following five different feature classes.

A first feature class includes character-level features such as capitalization, all-caps formatting, character length, presence of opening/closing parentheses, presence and position of digits and non-alphabetic characters, and minimum and average character unigram/bigram/trigram frequencies. In an exemplary embodiment of the smart selection technique these frequencies are based on frequency tables that are computed offline from information content in the large knowledge base. A second feature class includes stop-word features which indicate the presence of a stop word that appears in a stop word list. A third feature class includes TF-IDF (term frequency inverse document frequency) scores that are pre-computed from information content statistics for the large knowledge base. A fourth feature class includes knowledge base features that indicate whether a given character string matches an item or part of an item in the aforementioned Web graph. A fifth feature class includes lexical features that capture the full character string of the current candidate text span and the full character string of the candidate expansion word to the left/right of the current candidate text span.

2.3.2 Heuristic Methods

In addition to the named entity recognizer, noun phrase detector, knowledge base lookup and hyperlink intent model methods for identifying candidate text spans, various heuristic methods can also be used to identifying candidate text spans. Examples of such heuristic methods will now be described in more detail.

In one embodiment of the smart selection technique described herein a heuristic is used which assumes that the word that is identified by the location pointer is the text span that the user intended to select. As such, this particular heuristic outputs just a single candidate text span that is the word that is identified by the location pointer.

In another embodiment of the smart selection technique described herein a capitalization-based heuristic is used which is based on the fact that in the English language proper names are capitalized. Suppose a user is a user is reading or authoring a document that includes the text span "Barack Obama". If the user selects either any part of the word "Barack" or any part of the word "Obama", it is likely that the user is interested in the multi-word text span "Barack Obama". As such, an exemplary implementation of the capitalization-based heuristic operates in the following manner. Whenever the word that is identified by the location pointer is capitalized, the capitalization-based heuristic will evaluate the string of characters to the left of this capitalized word in the document and the string of characters to the right of this capitalized word in the document, and will expand this capitalized word to the longest possible uninterrupted sequence of capitalized words. The capitalization-based heuristic will then output this longest possible uninterrupted sequence of capitalized words. The capitalization-based heuristic may also output each other sub-sequence of capitalized words that exists within this longest possible uninterrupted sequence of capitalized words and includes the capitalized word that is identified by the location pointer. By way of example but not limitation, in the case where the user selects any part of the word "Buckley" from within the text span "William F. Buckley, Jr.", the capitalization-based heuristic will output the candidate text span "William F. Buckley, Jr.", and may also output the candidate text spans: "F. Buckley", "William F. Buckley", "Buckley, Jr.", and "F. Buckley, Jr.".

2.4 Machine-Learned Ensemble Model

The machine-learned ensemble model is a meta-model that uses an ensemble learning approach to re-score each of the scored candidate text spans that is received from each of the different candidate text span generation methods. As described heretofore, the machine-learned ensemble model is trained using a machine learning method (e.g., either logistic regression, or a conventional gradient-boosted decision trees method, or a conventional support vector machine method, among others) and features from the dataset of true intended user text span selections. The machine-learned ensemble model includes 22 different features which can be grouped into the following three different feature classes. A first feature class includes features that are related to the individual candidate text span generation methods. A second feature class includes features that are related to the word that is identified by the location pointer. A third feature class includes features that are related to each of the scored candidate text spans that is output by the different candidate text span generation methods.

Given a particular scored candidate text span that is being re-scored by the machine-learned ensemble model, the features in the first feature class include whether a particular candidate text span generation method generated the particular scored candidate text span and the score that this particular method assigned thereto. In the case where the particular scored candidate text span is not in the ranked list that is output by a given candidate text span generation method, the machine-learned ensemble model sets its score to zero. The features in both the second and third feature classes account for length and capitalization properties of the word that is identified by the location pointer, and of the particular scored candidate text span (e.g., token length, ratio of capitalized tokens, ratio of capitalized characters, whether or not the first and last tokens are capitalized, and the like).

As described heretofore, in an exemplary embodiment of the smart selection technique described herein each of the $\langle d, \tau \rangle$ pairs in the dataset of true intended user text span selections is assigned to one of five randomly chosen folds. The machine-learned ensemble model is trained by performing a cross-validation over these folds. In other words, for each of the folds in the dataset of true intended user text span selections the machine-learned ensemble model is used to score each of the $\langle d, \tau \rangle$ pairs in the fold while using the $\langle d, \tau \rangle$ pairs in the other four folds as training data for the model. It is noted that all of the true intended user text span selections $\tau$ for a given $\langle d, s \rangle$ pair are assigned to a single fold so that none of the simulated user text span selections from the testset of simulated user text span selections are seen during the training of the machine-learned ensemble model.

3.0 Additional Embodiments

Figure 6A:
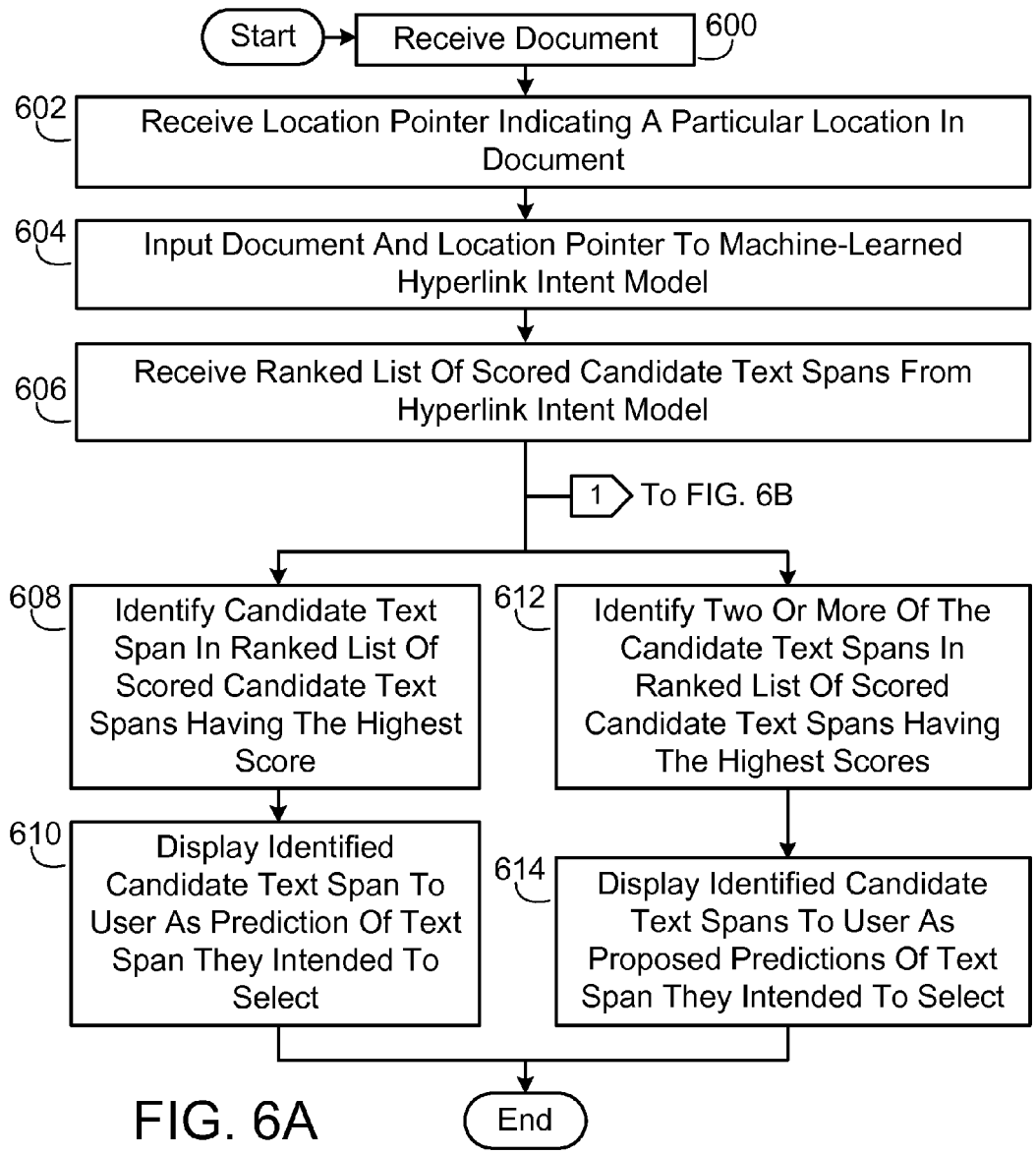
FIGS. 6A and 6B are a flow diagram illustrating another embodiment, in simplified form, of a process for predicting a text span forming either a single word or a series of two or more words that a user intended to select.
Figure 6B:
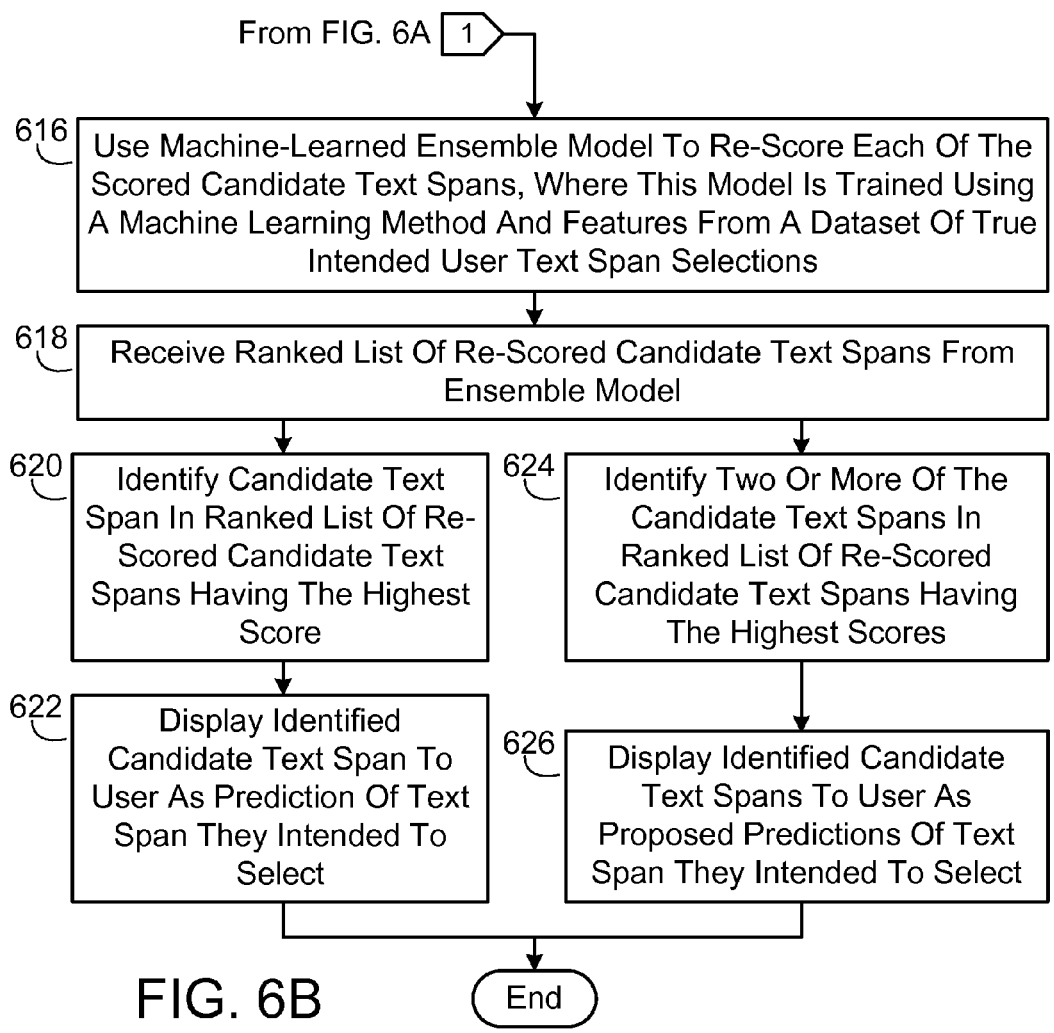

While the smart selection technique has been described by specific reference to embodiments thereof, it is understood that variations and modifications thereof can be made without departing from the true spirit and scope of the smart selection technique. By way of example but not limitation, FIGS. 6A and 6B illustrate another embodiment, in simplified form, of a process for predicting a text span forming either a single word or a series of two or more words that a user intended to select. As exemplified in FIG. 6A, the process starts with receiving a document that includes a string of characters (action 600). A location pointer is then received that indicates a particular location in the document (action 602). In the case where this particular location corresponds to a specific character in the document, the location pointer will be a character offset that indicates this specific character that the user selected in the document. The document and location pointer are then input to the aforementioned machine-learned hyperlink intent model (action 604). A ranked list of scored candidate text spans is then received from the hyperlink intent model (action 606). One or more predictions of the text span that the user intended to select are then provided to the user in the following manner. In one embodiment of the smart selection technique described herein the candidate text span in the ranked list of scored candidate text spans having the highest score is identified (action 608), and this identified candidate text span is displayed to the user as a prediction of the text span that they intended to select (action 610). In another embodiment of the smart selection technique two or more of the candidate text spans in the ranked list of scored candidate text spans having the highest scores are identified (action 612), and these identified candidate text spans are displayed to the user as proposed predictions of the text span that they intended to select (action 614).

As exemplified in FIG. 6B, an alternate embodiment of the text span prediction process is also possible where the aforementioned machine-learned ensemble model is used to re-score each of the scored candidate text spans (action 616) that is received from the hyperlink intent model. A ranked list of re-scored candidate text spans is then received from the ensemble model (action 618). One or more predictions of the text span that the user intended to select are then provided to the user in the following manner. In one embodiment of the smart selection technique described herein the candidate text span in the ranked list of re-scored candidate text spans having the highest score is identified (action 620), and this identified candidate text span is displayed to the user as a prediction of the text span that they intended to select (action 622). In another embodiment of the smart selection technique two or more of the candidate text spans in the ranked list of re-scored candidate text spans having the highest scores are identified (action 624), and these identified candidate text spans are displayed to the user as proposed predictions of the text span that they intended to select (action 626).

It is also noted that any or all of the aforementioned embodiments can be used in any combination desired to form additional hybrid embodiments. Although the smart selection technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Exemplary Operating Environments

Figure 7:
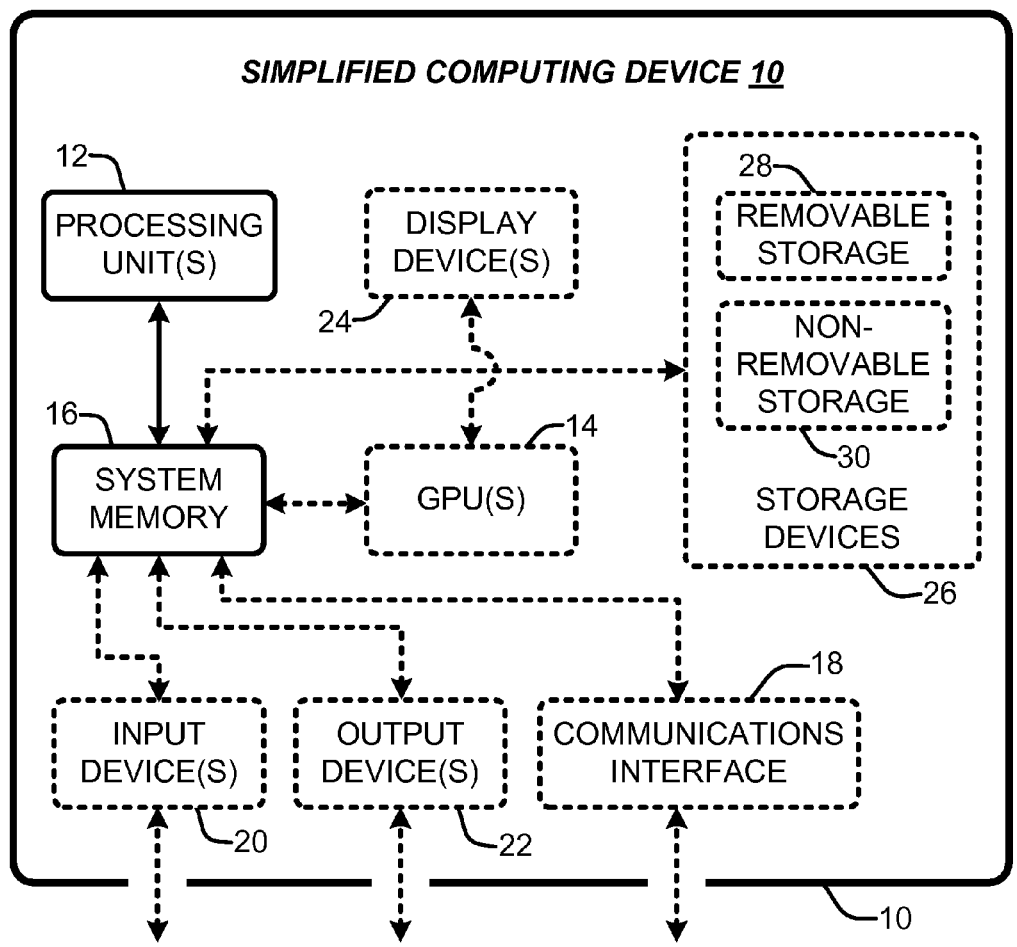
FIG. 7 is a diagram illustrating a simplified example of a general-purpose computer system on which various embodiments and elements of the smart selection technique, as described herein, may be implemented.

The smart selection technique embodiments described herein are operational within numerous types of general purpose or special purpose computing system environments or configurations. FIG. 7 illustrates a simplified example of a general-purpose computer system on which various embodiments and elements of the smart selection technique, as described herein, may be implemented. It is noted that any boxes that are represented by broken or dashed lines in the simplified computing device 10 shown in FIG. 7 represent alternate embodiments of the simplified computing device. As described below, any or all of these alternate embodiments may be used in combination with other alternate embodiments that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the smart selection technique embodiments described herein, the device should have a sufficient computational capability and system memory to enable basic computational operations. In particular, the computational capability of the simplified computing device 10 shown in FIG. 7 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 shown in FIG. 7 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 7 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EE-PROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various smart selection technique embodiments described herein, or portions thereof, may be stored, received, transmitted, or read from any desired combination of computer-readable or machine-readable media or storage devices and communication media in the form of computer-executable instructions or other data structures.

Finally, the smart selection technique embodiments described herein may be further described in the general context of computer-executable instructions, such as program modules, being executed by a computing device. Generally, program modules include routines, programs, objects, components, data structures, and the like, that perform particular tasks or implement particular abstract data types. The smart selection technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for predicting a text span forming either a single word or a series of two or more words that a user intended to select, comprising:
   using a computer to perform the following process actions:
   receiving a document comprising a string of characters;
   receiving a location pointer indicating a particular location in the document;
   inputting the document and the location pointer to a plurality of different candidate text span generation methods;
   receiving a ranked list of one or more scored candidate text spans from each of the different candidate text span generation methods;
   using a machine-learned ensemble model to re-score each of the scored candidate text spans received from each of the different candidate text span generation methods, the ensemble model being trained using a machine learning method and features from a dataset of true intended user text span selections; and
   receiving a ranked list of re-scored candidate text spans from the ensemble model.

2. The process of claim 1, wherein the location pointer comprises a character offset indicating a specific character that the user selected in the document.

3. The process of claim 1, further comprising the actions of:
   identifying the candidate text span in the ranked list of re-scored candidate text spans having the highest score; and
   displaying said identified candidate text span to the user as a prediction of the text span that they intended to select.

4. The process of claim 3, wherein said identified candidate text span comprises a phrase comprising two or more words.

5. The process of claim 1, further comprising the actions of:
   identifying two or more of the candidate text spans in the ranked list of re-scored candidate text spans having the highest scores; and
   displaying said identified candidate text spans to the user as proposed predictions of the text span they intended to select.

6. The process of claim 1, wherein the different candidate text span generation methods comprise either:
   a plurality of different linguistic unit detector methods; or
   a plurality of different heuristic methods; or
   a combination of one or more different linguistic unit detector methods and one or more different heuristic methods.

7. The process of claim 6, wherein the location pointer identifies a word that the user selected in the document, and the different linguistic unit detector methods comprise a hyperlink intent model method which uses a machine-learned hyperlink intent model to identify candidate text spans that subsume said identified word.

8. The process of claim 6, wherein the location pointer identifies a word that the user selected in the document, and the different linguistic unit detector methods comprise one or more different named entity recognizer methods each of which identifies a candidate text span comprising a named entity that subsumes said identified word.

9. The process of claim 6, wherein the location pointer identifies a word that the user selected in the document, and the different linguistic unit detector methods comprise one or more different noun phrase detector methods each of which identifies candidate text spans comprising noun phrases that subsume said identified word.

10. The process of claim 6, wherein the location pointer identifies a word that the user selected in the document, and the different linguistic unit detector methods comprise a knowledge base lookup method which uses a Web graph to identify candidate text spans comprising either named entities that subsume said identified word, or noun phrases that subsume said identified word, or concepts that subsume said identified word, the Web graph comprising information from one or more different knowledge bases.

11. The process of claim 6, wherein the location pointer identifies a word that the user selected in the document, and the different heuristic methods comprise a heuristic which assumes that said identified word is the text span that the user intended to select.

12. The process of claim 6, wherein the location pointer identifies a word that the user selected in the document, and the different heuristic methods comprise a capitalization-based heuristic which, whenever said identified word is capitalized, evaluates the string of characters to the left of said identified word and the string of characters to the right of said identified word, and expands said identified word to the longest possible uninterrupted sequence of capitalized words.

13. The process of claim 1, wherein the dataset of true intended user text span selections is either,
   (a) constructed using a large-scale crowd-sourcing method, or
   (b) augmented with a testset of simulated user text span selections, or
   (c) both (a) and (b).

14. The process of claim 1, wherein the computer is touch-enabled and comprises a touch-sensitive display screen, the document is displayed on said screen, and the location pointer is generated by the user touching said screen on top of the particular location in the document.

15. A computer-implemented process for predicting a text span forming either a single word or a series of two or more words that a user intended to select, comprising:
   using a computer to perform the following process actions:
   receiving a document comprising a string of characters;
   receiving a location pointer indicating a particular location in the document;
   inputting the document and the location pointer to a machine-learned hyperlink intent model; and
   receiving a ranked list of scored candidate text spans from the hyperlink intent model.

16. The process of claim 15, wherein the location pointer identifies a word that the user selected in the document, and the action of receiving a ranked list of scored candidate text spans from the hyperlink intent model comprises the actions of:
   (a) assigning said identified word to be a current candidate text span;
   (b) evaluating the expansion of the current candidate text span one word to the left thereof, said evaluation comprising the actions of using the hyperlink intent model and a leftward binary classifier to score said leftward expansion, and storing said leftward expansion and its score in the ranked list of scored candidate text spans;
   (c) evaluating the expansion of the current candidate text span one word to the right thereof, said evaluation comprising the actions of using the hyperlink intent model and a rightward binary classifier to score said rightward expansion, and storing said rightward expansion and its score in the ranked list of scored candidate text spans;
   (d) selecting the greater of the score for expanding the current candidate text span one word to the left thereof and the score for expanding the current candidate text span one word to the right thereof;
   (e) whenever said selected score is greater than a prescribed threshold, assigning the expansion corresponding to said selected score to be the current candidate text span, and repeating actions (b)-(e).

17. The process of claim 16, wherein,
   the leftward binary classifier uses logistic regression and a leftward set of features comprising features which are computed over the current candidate text span, features which are computed over the one word to the left of the current candidate text span, and features which are computed over another word that is immediately to the left of said one word to the left, and
   the rightward binary classifier uses logistic regression and a rightward set of features comprising features which are computed over the current candidate text span, features which are computed over the one word to the right of the current candidate text span, and features which are computed over another word that is immediately to the right of said one word to the right.

18. The process of claim 15, wherein the hyperlink intent model is trained using a set of training data that is automatically generated from anchor texts which are randomly sampled from a knowledge base, said training data comprising both positive training examples and negative training examples.

19. The process of claim 15, further comprising the actions of:
   using a machine-learned ensemble model to re-score each of the scored candidate text spans, the ensemble model being trained using a machine learning method and features from a dataset of true intended user text span selections; and
   receiving a ranked list of re-scored candidate text spans from the ensemble model.

20. A system for predicting a text span forming either a single word or a series of two or more words that a user intended to select, comprising:

a computing device comprising a display device; and a computer program having program modules executable by the computing device, the computing device being directed by the program modules of the computer program to, receive a document comprising text, receive a location pointer indicating a particular location in the document;

input the document and the location pointer to a plurality of different candidate text span generation methods comprising one or more different linguistic unit detector methods and one or more different heuristic methods, receive a ranked list of one or more scored candidate text spans from each of the different candidate text span generation methods, use a machine-learned ensemble model to re-score each of the scored candidate text spans received from each of the different candidate text span generation methods, the ensemble model being trained using a machine learning method and features from a dataset of true intended user text span selections, said dataset being augmented with a testset of simulated user text span selections, receive a ranked list of re-scored candidate text spans from the ensemble model, identify the candidate text span in the ranked list of re-scored candidate text spans having the highest score, and display said identified candidate text span on the display device as a prediction of the text span that the user intended to select.

\* \* \* \* \*